Jan. 29, 1929.

R. G. MOORE 1,700,509

LUBRICATING SYSTEM

Filed Jan. 4, 1924

Inventor
Raymond Guy Moore
By Williams Bradbury
McCabe & Pince Attys.

Patented Jan. 29, 1929.

1,700,509

UNITED STATES PATENT OFFICE.

RAYMOND GUY MOORE, OF BRIDGEPORT, CONNECTICUT, ASSIGNOR TO ALEMITE MANUFACTURING CORPORATION, OF CHICAGO, ILLINOIS, A CORPORATION OF DELAWARE.

LUBRICATING SYSTEM.

Application filed January 4, 1924. Serial No. 684,337.

My invention relates to improvements in lubricating systems, and is particularly concerned with improvements in that type of lubricating system comprising a plurality of fittings, one of which is secured to each of the bearings of a mechanism to be lubricated, and a lubricant compressor having means for successively making sealed contact with each of the fittings so that lubricant under pressure can be forced thereinto.

Systems of the character described above are now in extended use for lubricating automobiles and industrial machinery. Some of these systems make use of compressors having flexible discharge conduits to enable the coupling member at the end thereof to be successively secured to the various fittings, but in certain kinds of machinery it is more or less difficult to make this connection on account of the inaccessibility of the fittings. Other compressors now in use have rigid discharge conduits which make it possible to guide the coupling members, but with compressors having such discharge conduits it is practically impossible to make connection with the fittings unless they are parallel with the line of approach of the coupling member on the compressor.

One of the objects of my invention is to provide a compressor which will obviate the defects of the compressors enumerated above,—that is, to provide a compressor which will enable the operator to make connection with a fitting located at a comparatively inaccessible position, even though the fitting may extend at an angle to the line of approach to it.

Another object of my invention is to provide a compressor comprising means of the character described in which the coupling member at the end of the discharge conduit is secured to the fittings by a rotary movement of the coupling member relatively to the fitting.

Another object of my invention is to provide a lubricating system such as described in which the fitting co-acts with the compressor to cause rotation of the coupling member and thereby to effect a connection of the coupling member with the fitting.

A still further object of my invention is to provide a lubricating system and a compressor of the character described which are simple in construction, economical to manufacture and easy to operate.

Figure 1:
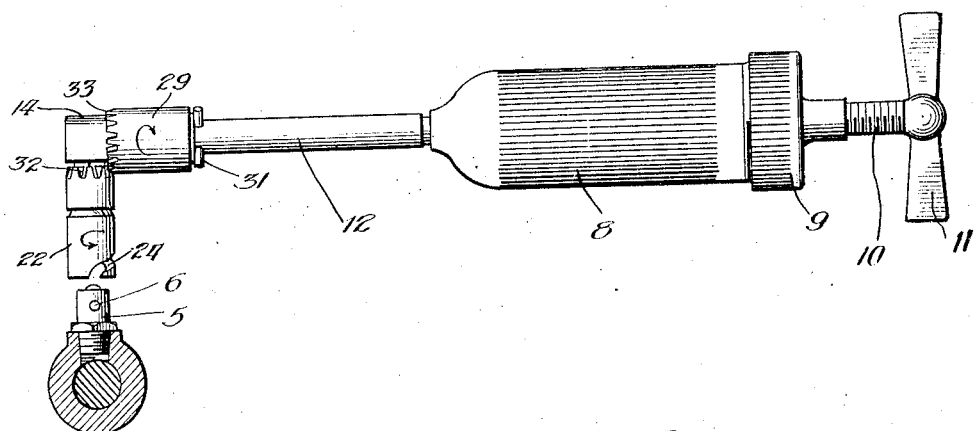
Figure 2:
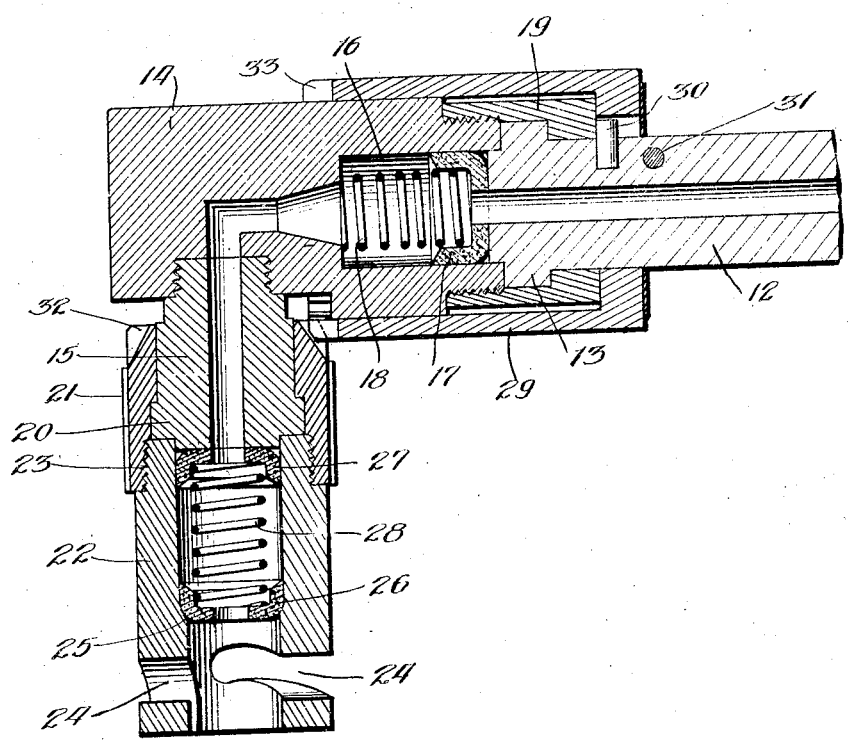

Other objects of my invention will appear as this description progresses, reference being had to the accompanying drawings, in which Figure 1 is a side elevation of my improved compressor illustrating the mode of applying it to a fitting; and Figure 2 is a central longitudinal section through the coupling member and the means for actuating the coupling member.

In the embodiment of my invention illustrated herein, I have illustrated my improved lubricating system as comprising a plurality of fittings 5, only one of which is shown. This fitting comprises among other things a pin 6, the ends of which project beyond the sides of the fitting for a purpose about to be described.

The compressor forming a part of my invention is provided with a barrel 8 having a detachable cap 9 into which is threaded the piston rod 10, the outer end of which is provided with a handle 11. The inner end of the piston rod 10 carries a piston (not illustrated) for placing the lubricant in the barrel 8 under pressure.

The barrel 8 is provided with a rigid discharge conduit 12, the free end of which is provided with an annular rib 13 upon which is swiveled the elbow comprising the member 14 and the swivel member 15 which is screwed into one side of the member 14. The member 14 is provided with a chamber 16 for receiving the cup leather 17 and the compression spring 18, which yieldingly holds the cup leather 17 in contact with the free end of the discharge conduit 12. A sleeve 19 clamps the annular rib 13 between itself and the inner end of the member 14.

The swivel member 15 is provided adjacent its outer end with an annular rib 20, which is confined between the two sleeves 21 and 22 which have threaded engagement at 23. In this manner the sleeve 22 is swiveled upon the swivel member 15. Adjacent its outer end the sleeve 22 is provided with two inclined bayonet slots 24 for receiving the projecting ends of the pins 6 of the fittings 5.

The inner end of the bore of the sleeve 22 is enlarged to form the shoulder 25 against which the cup leather 26 seats. A similar cup leather 27 seats against the end of the swivel member 20 to prevent leakage between this member and the sleeve 22. A compression spring 28, confined between the two cup leathers, yieldingly holds these cup leathers in their extreme positions. When the sleeve 22 is rotated to make connection with the fitting 5, the end of the fitting contacts with the cup leather 26 and forces it inwardly against the tension of the spring 28, thereby forming an initial seal which prevents the escape of lubricant between the coupling member and the fitting. The seal between the cup leather 26 and the fitting increases as the pressure upon the lubricant is increased.

A sleeve 29 surrounds the sleeve 19 and the inner end of the member 14 and is keyed to the outer end of the discharge conduit 12 by means of the pin 30. A second pin 31, extending transversely of the discharge conduit 12, holds the sleeve 29 in contact with the inner end of the sleeve 19. The inner end of the sleeve 21 and the outer end of the sleeve 29 are provided with co-acting gear teeth 32 and 33, so that upon rotation of the barrel 8, its movement will be communicated to the sleeve 29 through the discharge conduit 12. The rotation of the sleeve 29 thus produced will cause rotation of the sleeve 21 about the swivel member 15. If, therefore, the sleeve 22 is positioned over the end of the fitting 5 and the barrel 8 is turned in a clockwise direction, the sleeve 22 will be rotated in the proper direction to cause the bayonet slots 24 to receive the ends of the pins 6, and thereby mechanically connect the sleeve 22 with the fitting. This will bring the end of the fitting into sealing relation with the cup leather 26, as previously described, and the operator can then, by turning the handle 11 in the proper direction, force lubricant under pressure into the fitting. When sufficient lubricant has been supplied to the fitting, rotation of the barrel in a counter-clockwise direction will cause the sleeve 22 to be disengaged from the fitting and the compressor can then be applied to the next fitting and the process repeated until all of the fittings have been supplied with lubricant.

As clearly shown in the drawings, the diameter of the sleeve 29 is considerably greater than the diameter of the sleeve 21 and the angular distances through which the two sleeves rotate in coupling and uncoupling differ accordingly.

Where the bearings to be lubricated are of such character as not to require considerable pressure to be exerted upon the lubricant to effect the proper lubrication of the bearings, the operator can attach the compressor to a fitting by grasping the handle of the compressor and manipulating it as described above, and then continue the rotation of the handle until sufficient lubricant has been supplied to the bearing. If, however, it is necessary to apply considerable pressure to the bearing, the operator should, after having effected a connection between the compressor and a fitting, grasp the barrel of the compressor with the other hand so as to relieve the fitting of the torsional stress which would otherwise be imposed upon it.

From the preceding description, it will be apparent that I have provided a compressor which under usual conditions can be operated by one hand, and that with the construction shown it is a comparatively easy task to effect a connection with a fitting even though it be located in a more or less inaccessible position. It will also be apparent that the construction described is simple and economical to manufacture.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A lubricant compressor comprising a barrel having a rigid discharge conduit, an elbow swiveled upon the free end of said conduit, a sleeve swiveled upon the angularly extending portion of said elbow, said sleeve having a slot formed in the free end thereof for receiving the locking pin of a fitting, a gasket slidably mounted in said sleeve for making contact with the end of said fitting, a second sleeve surrounding and rigidly secured to the outer end of said discharge conduit, the adjacent ends of said sleeves being provided with meshing gear teeth.

2. A lubricant compressor comprising a barrel having a rigid discharge conduit, an elbow swiveled upon the free end of said conduit, a sleeve swiveled upon the angularly extending portion of said elbow, said sleeve having a slot formed in the free end thereof for receiving the locking pin of a fitting, a second sleeve surrounding and rigidly mounted with respect to said barrel, the adjacent ends of said sleeves being provided with meshing gear teeth.

3. A lubricant system comprising a fitting and a compressor for supplying lubricant thereto, said compressor comprising a barrel having a rigid discharge conduit, an elbow swiveled upon the outer end of said discharge conduit, a sleeve swiveled upon the angularly extending portion of said elbow, said sleeve and fitting being provided with co-acting means for connecting said sleeve to said fitting upon the rotation of said sleeve relatively to said fitting and means by which said sleeve can be rotated by the rotation of said barrel to effect the connection of said sleeve with said fitting.

4. A lubricant system comprising a fitting and a compressor for supplying lubricant thereto, said compressor comprising a barrel having a rigid discharge conduit, an elbow swiveled upon the outer end of said discharge conduit, a sleeve swiveled upon the angularly extending portion of said elbow, said sleeve and fitting being provided with co-acting means for connecting said sleeve to said fitting upon the rotation of said sleeve relatively to said fitting, means in said sleeve for making sealed contact with the end of said fitting, and co-acting means on said discharge conduit and said sleeve by which said sleeve can be rotated by the rotation of said barrel to effect the connection of said sleeve with said fitting.

5. The combination of a fitting and a compressor for supplying lubricant to said fitting, said compressor comprising a barrel having a rigid discharge conduit, a coupling member swiveled upon the end of said discharge conduit and extending at an angle thereto, means for rotating said coupling member when said barrel is rotated, and co-acting means upon said coupling member and said fitting for effecting a connection therebetween upon the rotation of said coupling member.

6. The combination of a fitting and a compressor for supplying lubricant to said fitting, said compressor comprising a barrel having a rigid discharge conduit, a coupling member swiveled upon the end of said discharge conduit, means for rotating said coupling member when said barrel is rotated, and co-acting means upon said coupling member and said fitting for effecting a connection therebetween upon the rotation of said coupling member.

7. The combination of a fitting and a compressor for supplying lubricant thereto, said compressor comprising a barrel having a rigid discharge conduit terminating in an angularly disposed coupling member, and co-acting relatively movable means on said discharge conduit and coupling member for effecting a connection between said fitting and said coupling member.

8. The combination of a fitting and a compressor for supplying lubricant thereto, said compressor comprising a barrel having a discharge conduit terminating in a coupling member, and co-acting relatively movable means on said discharge conduit and coupling member for effecting a connection between said fitting and said coupling member.

9. A lubricant compressor comprising a barrel and a coupling member for establishing communication between said barrel and a fitting, said coupling member being disposed at an angle to the axis of said barrel, and means actuated by the rotation of said barrel for rotating said coupling member relatively to said barrel.

10. A lubricant compressor comprising a barrel and a coupling member for establishing communication between said barrel and a fitting, and means actuated by the rotation of said barrel for rotating said coupling member relatively to said barrel.

11. A lubricant compressor comprising a barrel having a rigid discharge conduit, a coupling member angularly swiveled upon the end of said discharge conduit, and means for rotating said coupling member by the rotation of said barrel, the rate of rotation of said coupling member being different than the rate of rotation of said barrel.

12. A lubricant compressor comprising a barrel having a discharge conduit, a coupling member swiveled upon the end of said discharge conduit, and means for rotating said coupling member by the rotation of said barrel, the rate of rotation of said coupling member being different than the rate of rotation of said barrel.

13. The combination of a fitting and a compressor for supplying lubricant thereto, said compressor comprising a barrel having a rigid discharge conduit rigidly mounted thereon, a rigid coupling member having an axis lying at an angle to the axis of the conduit, and a mechanical connection constraining said coupling and said conduit to simultaneous rotation about their respective axes, said coupling and fitting having means for effecting a connection upon rotation of said coupling.

14. The combination of a fitting and a compressor for supplying lubricant thereto, said compressor comprising a barrel having a rigid discharge conduit, a coupling member having an axis lying at a fixed angle to the axis of the conduit, and a mechanical connection constraining said coupling and said conduit to simultaneous rotation about their respective axes, said coupling and fitting having means for effecting a connection upon rotation of said coupling.

15. The combination of a fitting and a compressor for supplying lubricant thereto, said compressor comprising a barrel having a discharge conduit, a rigid coupling member having an axis lying at an angle to the axis of the barrel, and a mechanical connection constraining said coupling and barrel to simultaneous rotation about their respective axes at different rates, said coupling and fitting having means for effecting a connection upon rotation of said coupling.

In witness whereof, I hereunto subscribe my name this 26th day of December, 1923.

RAYMOND GUY MOORE.